US012693264B2

(12) United States Patent
Maletinsky et al.

(10) Patent No.: US 12,693,264 B2
(45) Date of Patent: Jul. 28, 2026

(54) DETECTION OF MAGNETIZATION INHOMOGENEITIES IN ULTRA-SCALED MAGNETIC NANOWIRES

(71) Applicant: QNAMI AG, Muttenz (CH)

(72) Inventors: Patrick Maletinsky, Zürich (CH); Hai Zhong, Freiburg (DE); Felipe Favaro De Oliveira, Augst (CH)

(73) Assignee: Qnami AG, Muttenz (CH)

( * ) Notice: Subject to any disclaimer, the term of this patent is extended or adjusted under 35 U.S.C. 154(b) by 198 days.

(21) Appl. No.: 18/578,880

(22) PCT Filed: Jul. 12, 2022

(86) PCT No.: PCT/IB2022/056427
§ 371 (c)(1),
(2) Date: Jan. 12, 2024

(87) PCT Pub. No.: WO2023/285966
PCT Pub. Date: Jan. 19, 2023

(65) Prior Publication Data
US 2024/0255468 A1    Aug. 1, 2024

(30) Foreign Application Priority Data

Jul. 13, 2021    (EP) .................................... 21185232

(51) Int. Cl.
*G01N 27/82* (2006.01)
*G01N 24/00* (2006.01)
(52) U.S. Cl.
CPC ........... *G01N 27/82* (2013.01); *G01N 24/006* (2013.01)

(58) Field of Classification Search
CPC ...... G01N 27/82; G01N 24/006; G01N 24/10; G01R 33/323; G01R 33/60; G01R 33/26
See application file for complete search history.

(56) References Cited

U.S. PATENT DOCUMENTS

| 2015/0253355 A1* | 9/2015 | Grinolds | ................ | G01R 33/60 |
| | | | | 850/40 |
| 2016/0282427 A1* | 9/2016 | Heidmann | ............. | G11B 5/012 |
| 2020/0088762 A1* | 3/2020 | Zhou | ....................... | G01Q 70/14 |
| 2021/0080517 A1* | 3/2021 | Hart | ....................... | B82Y 20/00 |

(Continued)

FOREIGN PATENT DOCUMENTS

| EP | 3376245 A1 | 9/2018 |
| WO | 2014051886 A1 | 4/2014 |

OTHER PUBLICATIONS

Nanoscale imaging and control of domain-wall hopping with a nitro-gen-vacancy center microscope (Year: 2014).*

(Continued)

*Primary Examiner* — Dominic E Hawkins

(74) *Attorney, Agent, or Firm* — McDonald Hopkins LLC

(57) ABSTRACT

The invention concerns a method for nonperturbative detection of one or more magnetic inhomogeneities resulting from nano-defects in a single longitudinal anisotropic magnetic sample structure having a nanometric cross-sectional dimension. A solid-state lattice with a single spin defect is used for magnetometry assessment of the anisotropic magnetic sample structure to determine quantitative information concerning minor defects and inconsistencies in the sample structure.

19 Claims, 5 Drawing Sheets

(56) References Cited

U.S. PATENT DOCUMENTS

2021/0378569 A1* 12/2021 Ma ......................... A61B 5/243

OTHER PUBLICATIONS

Rondin, et al., Nanoscale magnetic field mapping with a single spin scanning probe magnetometer; Applied Physics Letters, 2012, No. 100, 153118, XP-002718854.

Lee, et al., Magnetic imaging of a single ferromagnetic nanowire using diamond atomic sensors; Nanotechnology, 2018, No. 29, IOP Publishing, XP20331090A.

Tetienne,et.al., Nanoscale imaging and control of domain-wall hopping with a nitrogen-vacancy center microscope; Science-sciencemag.org, Jun. 20, 2014, vol. 344, Issue 6190, XP55867936A.

Berganza, et. al., Multisegmented Nanowires: a Step towards the Control of the Domain Wall Configuration; Scientific Reports, 2017, 7:11576, XP55969269A.

Maletinsky, et. al., A robust, scanning quantum system for nanoscale sensing and imaging; arxiv.org; 2011, XP80522275A.

Dutta, et. al., Sub-100 nm2 Cobalt Interconnections; IEEE Electron Device Letters, May 2018, vol. 39, No. 5, pp. 731-734,.

International Search Report issued in corresponding International PCT Application No. PCT/IB2022/056427; Dated: Oct. 18, 2022.

Written Opinion of the International Searching Authority issued in corresponding International PCT Application No. PCT/IB2022/056427; Dated: Oct. 18, 2022.

Celano et al., "Probing Magnetic Defects in Ultra-Scaled Nanowires with Optically Detected Spin Resonance in Nitrogen-Vacancy Center in Diamond", Nano Lett. 2021, 21, 10409-10415.

Office Action in EP 22741862.1, dated Feb. 18, 2025.

* cited by examiner

DETECTION OF MAGNETIZATION INHOMOGENEITIES IN ULTRA-SCALED MAGNETIC NANOWIRES

TECHNICAL DOMAIN

The present invention concerns a method to quantify structural integrity in switching elements, as used in spintronic devices.

RELATED ART

The successful development of spintronics devices is built on the availability of magnetic switching elements to perform logic and memory operations. Magnetic nanowires (NWs) are essential building-blocks as they are considered reliable and offer design flexibility, multiple options for large-area fabrication, and alternative strategies for tuning the magnetic properties of the wire through geometry and anisotropy.

For their application in spintronic devices NWs are usually patterned on a carrier material, for example silicon or silicon dioxide ($SiO_2$). Such NW assemblies permit to densely arrange a large number of nanowires, for example between 3'000 to 20'000 NW per millimetre (mm) width of the substrate. The NWs are usually distributed uniformly over the area of the carrier material. Switching assemblies for spintronic devices can for example be fabricated through subtractive patterning in analogy to gate spacers from complementary metal-oxide-semiconductor (CMOS) manufacturing processes.

Patterned magnetic nanowires represent an optimal media for fast propagation of domain walls (DWs) and high storage density in the ever-growing field spintronic devices. Valid for both logic and memory application, NW-based devices offer fast switching speed, good scalability, and low-power operation. Most importantly, NWs are a convenient architecture to obtain bistable magnetic configuration, single magnetic easy axis, and tuneable properties by changing wire geometry and anisotropy.

Importantly, the large uniaxial magnetic anisotropy along their entire length of the wire, namely shape anisotropy, suggest that nanowires have a single magnetic domain that should not generate stray magnetic fields along the entire length of the wire, unless DWs are deliberately injected. DWs can for example be artificially introduced by AC demagnetization along the NW or by applying sub-Tesla magnetic fields perpendicular to the NW. For this reason, nanowires, and in particular ultra-scaled NWs having a width of 10 nanometres (nm) or less, are generally considered as frontrunner for the integration of emerging device concepts in the field of high density of data and computation.

Years of research have been focused on device engineering and control of the dynamic switching for memory and logic function by position manipulation of DWs. In doing so, the spintronic community has clearly recognised the major impact of magnetic defects and localized inhomogeneities on the electrical/magnetic switching of NWs-based devices, and thus on the performance and reliability of these devices.

While these research studies have opened the path for new devices based on DWs manipulation, the localized sensing of individual defects, nonperturbative characterization of weak field distributions (over large areas), and the reconstruction of the three-dimensional (3D) field orientations remain important challenges for the community today.

In line with the advancement in spintronics technology, the engineering and fabrication of NWs has been continuously optimised. State-of-the art NWs are commonly recognised for being homogeneous in nature with a single magnetic domain along the wire devoid of magnetic stray fields.

Given that the integrity of magnetic switching elements is fundamental for the reliability and efficacy of logic and memory operations of spintronic devices, this assumed magnetic homogeneity of NWs has been extensively studied using techniques such as magnetic force microscopy (MFM). At present, state-of-the-art NWs are believed to be largely defect-free since MFM measurements have not identified nano-defects or inconsistencies in NWs. Such defects would give rise to stray magnetic fields that are generated by inhomogeneities in the magnetization and material distribution along the wire.

Over the last decade, scanning probe microscopy using solid state defects in diamond, namely nitrogen-vacancy (NV) centres, has made considerable advances to map thermal as well as magnetic properties of conventional samples at spatial resolutions in the nanometre range. First commercial systems are now available.

For example, document WO2014051886 discloses a diamond sensing probe with an outcoupling structure, which is a diamond nanopillar, and spin defects located in the apex of the sensing outcoupling structure.

Document EP3376245 discloses a sensor device based on a microscale probe having a spin defect. The sensor device further comprises a microwave antenna which is arranged at a distance of less than 500 micrometres from the spin defect.

In recent years, the fabrication of NWs has become more sophisticated and reliable, resulting in devices that meet industrial requirements and are well-suited for spintronic applications. Advancements in fabrication technology are increasingly important to meet the growing demand in scaled down NWs with ever smaller cross-sectional dimensions, in which structural and chemical homogeneity is crucial for reliable performance.

Based on MFM, as well as SEM and TEM evaluations, NW produced according to state-of-the-art technology, such as for example NWs disclosed in S. Dutta et al., "Sub-100 nm2 Cobalt Interconnects," in *IEEE Electron Device Letters*, vol. 39, no. 5, pp. 731-734, May 2018, doi: 10.1109/LED.2018.2821923, have been confirmed to be devoid of any defects which could impact on the propagation of DW and/or the dynamic switching required for memory and logic functions.

While MFM images could discern deliberately injected DWs in NWs, the domains themselves appeared homogenous in previous studies such as Berganza E. et al., 2017, Nature Scientific Reports 7: 11576|DOI: 10.1038/s41598-017-11902-w; and Gartside J. C. et al., 2016, Nature Scientific Reports, 6: 32864|DOI: 10.1038/srep32864. In fact, these studies found that shape anisotropy of the NW determined its magnetic configuration and confirmed the single domain state of the NW.

Tetienne J.-P. et al., 2014, Science, vol. 344, no. 6190, p. 1366-1369|DOI: 10.1126/science. 1248459 discloses the use of scanning NV centre microscopy (single NV centre) to image and control domain wall hopping. The sample structures studied are perpendicularly magnetized ultrathin stripes, described as having 1.5 μm-wide Ta/CoFeB/MgO stripes. DW were introduced into these structures by applying short magnetic field pulses. No nano-defects were detected in the sample structures imaged in this study.

Any hypothetical nano-defects in the patterned NWs which might not have been detected by means of the above-mentioned methods, are not expected to be significant enough to give rise to stray magnetic fields that would be detectable using these methods.

Despite the encouraging progresses in the field, spintronic devices have still shown to be affected by a wide range of fundamental magnetic phenomena, some of which are stochastic in nature, presenting a major challenge for their control, observation, and physical analysis.

Today's growing need for higher data processing speeds and larger data storage capabilities puts considerable pressure on scalability, reliability and quality of spintronic devices. As the demands on the technology increase, quality control will become a key issue in the fabrication of these devices. There is therefore a real need for a reliable method to detect and quantify any potential weaknesses which could affect the reliability and/or performance of a spintronics device.

SHORT DISCLOSURE OF THE INVENTION

It is an aim of the present invention to improve the reliability of spintronic devices. In particular, the present invention sets out to identify potential weaknesses in spintronic devices, which may negatively impact their reliability and/or performance.

It is another aim of this invention to provide a method suitable for improving quality control of spintronic devices.

According to the invention, these aims are attained by the object of the attached claims, and especially by the independent claims.

In particular, the aim is attained by the provision of a method for nonperturbative detection of one or more magnetic inhomogeneities resulting from nano-defects in a longitudinal anisotropic magnetic sample structure having a nanometric (nm) cross-sectional dimension, comprising a) movably positioning a sensing surface of a solid-state lattice sensor, which is preferably of diamond material, comprising one single spin defect in the apex of the solid-state lattice sensor, at a first scanning position in proximity of the magnetic sample structure, b) irradiating the single spin defect by applying optical radiation and a microwave field continuously or in one or more pulses to the one spin defect such as to detect a Zeeman shift upon exposure of the irradiated single spin defect to the magnetic field of the magnetic sample structure, c) detecting a photoluminescence (PL) output signal from the solid-state lattice sensor comprising the single spin defect, d) scanning the surface of the magnetic sample structure in performing steps a) to c) at a series of scanning positions over at least a portion of the length of the magnetic sample structure such as to obtain quantitative information on the magnetic field spatial distribution.

The nanometric dimension of the widest cross-section along the length of the anisotropic magnetic sample structure is comprised in a range of 1 nm to 500 nm, preferably from 1 nm to 50 nm, along its length.

The longitudinal anisotropic magnetic sample structure is preferably a nanowire.

The term "nanowire" as used herein refers to a wire having a cross-sectional dimension from 1 nm to 500 nm, or from 1 nm to 50 nm, along its length. The longitudinal dimension of the structure is at least 100 times larger, or at least 50 times larger, or at least 10 times larger than the widest cross-sectional dimension of the wire. The cross-sectional dimensions of the wire should preferably not vary by more than 10%, or not more than 20%, or not more than 50%, or not more than 100% over the length of the wire.

The anisotropy energies of the sample structures are largely dominated by shape anisotropy of the sample structure. The anisotropy of the sample structure is therefore a shape-induced anisotropy.

Preferably, the spin defect, which may also be referred to as a colour centre, is a nitrogen-vacancy (NV) point defect in the diamond lattice.

Remarkably, despite the prevailing understanding and contrary to reasonable expectations, the method is capable of detecting inhomogeneities in the magnetic field distribution of the anisotropic magnetic sample structure. The detection of these defects in the magnetization of these sample structures is unexpected, as any hypothetical defects, which are undetectable by conventional methods used in the art, such as MFM, have always been presumed insufficient to overcome the large magnetic anisotropy distribution near the surface of these structures.

With respect to what is known, the invention provides the advantage that it contributes new insights to the state-of-the-art, as it overcomes the generally accepted understanding that nanowires have no local nano-defects which give rise to magnetic stray fields. The term "nano-defects" as used herein means structural defects and/or chemical composition inhomogeneity having a maximum transversal dimension of no more than 50 nm, no more than 20 nm, preferably no more than 10 nm, or no more than 5 nm.

The invention provides solid evidence to the contrary. It demonstrates that previously presumed defect-free nanostructures, in particular nanowires, may in fact comprise minor defects, which have up to now never been identified. It is now for the first time possible to evaluate and correlate the impact of these defects on the performance and quality of anisotropic nano-structures. The identification of such defects will also be of significant importance to improve mathematical models that describe and predict the behaviour of NWs. This invention is therefore a significant contribution to the state-of-the-art.

Moreover, these nano-defects can now be identified and localised with nanoscale spatial accuracy, allowing for determination of the local quality of individual NWs. Since the method is nonperturbative and non-destructive, it can be used to measure the said defects and inhomogeneity in NWs without affecting its integrity or interfering with its composition. The information on the quality of the individual structure may form the basis of a decision in a quality control and/or assurance process.

In one embodiment the method comprises a further step of mapping detected inhomogeneities in the magnetic field distribution along the scanned portion of the magnetic sample structure. Individual defects in the sample structure and/or chemical composition can therefore be localised. In addition, specific portions of the sample structure having certain attributes, such as an undesirable accumulation of defects, can be identified. In a preferred embodiment, the method is capable of detecting local variations of 30% or less, preferably 20% or less, or 10% or less in the magnetisation of the anisotropic sample structure. The detection of local variation in this range are possible when a sensing system having a spatial resolution of less than 100 nm, for example between from 50 nm to 60 nm, and having a detection sensitivity of no more than $10 \, \mu T/\sqrt{Hz}$, or no more than $5 \, \mu T/\sqrt{Hz}$, preferably no more than $2.5 \, \mu T/\sqrt{Hz}$ is used.

A high spatial resolution is achieved locating the spin defect 100 nm or less, 50 nm or less, nm or less, ideally 10 nm or less, from the sensing surface of the solid-state lattice sensor.

Such variations may be the result of structural defects as well as local variation of the chemical composition of the NWs.

The magnetic fields strength at any scanning position may be calculated on the basis of the PL output signal, which is related to the magnetic field strength. The relation may be a proportional relation.

For determination of a full magnetic field distribution at a scanning position, an optically detected magnetic resonance (ODMR) spectrum can be recorded. To this end, the spin defect in the apex of the sensor is manipulated with microwave fields with frequencies ranging, for example, from 1 GHz to 10 GHz, preferably from 2.5 to 3.5 GHz.

In this embodiment, the magnetic field strength at a scanning position may be determined on the basis of identifying the resonance peaks in the ODMR spectrum generated by sweeping the applied microwave frequency and counting the photons emitted by the NV$^-$ centre. The separation distance between the PL output signal peaks is proportional to the magnetic field strength of the sample at the scanned position.

Preferably, the solid-lattice sensor is moved through a series of subsequent scanning position across the width of the sample performing scans, for example a full magnetic field distribution scan, at each position. The solid-lattice sensor is then moved to a scanning position along the length of the sample structure, where it performs further scans at each position. In this manner a complete scan of the surface can be obtained by assembling information received for each position of the cross-sweeping scans and by assembling consecutive cross-sweeping scans covering the length of the scanned portion of the sample.

The scan may be performed by one sensor moving across and along the sample structure. The scan may also be performed by several sensors, which may scan the samples at different positions. The plurality of sensors may perform their respective scans simultaneously. Alternatively, or additionally, the plurality of sensors may perform their respective scans sequentially.

The identified inhomogeneity in the magnetic field distribution is used to identify and/or to quantify a local inconsistency or nano-defects. Such inconsistencies may for example be an inconsistent geometry, for example an interruption, a roughness, a shape deformation, or an edge. The defects may for example be a local change in crystallinity, a point defect in the structure, a defect in an amorphous region, a defect in intrinsic composition, or chemical defect.

The identified inhomogeneity in the magnetic field distribution may also be caused by a DW. The identified inhomogeneity may relate to a transition between different magnetic moments in the magnetic sample structure. It may also relate to a vortex and/or transverse DWs with various rotation of magnetization parallel to the NW directions.

In a possible embodiment information regarding the quantitative and/or qualitative nature of a defect can be obtained by comparing the measured magnetic inhomogeneities to predetermined data.

The quantitative nature concerns the amount and/or periodicity of detected inhomogeneities in a portion of the sample structure. The quantitative nature also concerns the size or severity of a magnetic inhomogeneity.

The qualitative nature concerns the distinctive nature of the underlying defect. A qualitative assessment may for example discern between a fundamental structural defect and/or inhomogeneous chemical composition and a DW.

The predetermined data may for example be based on empirical data, for example on data obtained from previous measurements of comparable or substantially the same magnetic sample structures.

In addition, or alternatively, simulations may be performed to model predetermined data in order to interpret and/or to characterise defects or inconsistencies in the wire. Predetermined data and/or simulations may also be used in order to predict when the magnetization symmetry may be spontaneously broken by the presence of DWs.

For the detection of stray magnetic field along the anisotropic sample structure, a spatial resolution in the nanometre range, such as 100 nm or less, or 50 nm or 20 nm or less, ideally 10 nm or less, is desirable.

To achieve this spatial resolution, the spin defect should be positioned as closely as possible to the sensing surface of the solid-state lattice sensor and consequently the sample surface, since the distance between the spin defect and the sample surface defines the spatial resolution of the magnetometer. Spatial resolution decreases with an increasing distance between the spin defect and the sample surface.

For this reason, the spin defect is preferably located 100 nm or less, 50 nm or less, 20 nm or less, ideally 10 nm or less, from the sensing surface of the solid-state lattice sensor.

It is furthermore preferable to position the sensing surface of the solid-state lattice sensor at a distance of no more than 100 nm, or no more than 50 nm, or no more than 20 nm, preferably no more than 10 nm, or no more than 1 nm, from the sample surface.

A suitable solid-state lattice sensor may for example be a monocrystalline diamond sensor. The production of sensors made of monocrystalline diamonds is highly reproducible. NV centres can be created with a precision of 10 nm and less, making measurements with these sensors extremely reliable. Monocrystalline diamond sensors are also more robust and predictable, in particular compared to sensors in which nano-diamonds are attached to a tip of an atomic force microscope (AFM). The orientation of nanodiamonds cannot be sufficiently controlled when attaching them to an AFM tip, leading to difficulties in post-processing of measurement data. This disadvantage is also overcome by providing a sensor in form of a monocrystalline diamond structure, since the orientation of the NV centre in this sensor is fixed.

Preferably, the solid-state lattice sensor is suited for nonperturbative detection of magnetic stray fields in the sub-mT range arising from inhomogeneities in the magnetic sample structure.

A suitable solid-state lattice sensor may comprise a nanoscale outcoupling structure, preferably a nano-pillar or a nano-cone tapering towards the free end of the cone, with a single spin defect in the vicinity of its apex.

A suitable solid-state lattice sensor may also be a sensor with a microscale volume having a truncated conical or pyramidal shape tapering towards the free end of the sensor. This sensor may for example have a maximum transversal dimension of 200 nm to 500 nm. This conical or pyramidal sensor may for example have a sidewall inclination angle between 2° and 45°, preferably between 5° and 15° in respect of the height or the sensor.

A suitable solid-state lattice sensor, or the outcoupling structure of the sensor, may have a flat apex with a maximum transversal dimension of no more than 500 nm, or of no more than 200 nm, or of no more than 100 nm, or of no more than 50 nm, or of no more than 20 nm.

The sensor may also have a rounded apex. The sensor may have a sharp apex, having a curvature radius of less than 100 nm, or less than 10 nm, or less than 1 nm.

Advantageously, the magnetic measurements of the anisotropic sample structures may be performed at ambient conditions.

The method disclosed herein is suitable to measure magnetic field distribution and to detect stray magnetic fields of uniaxial sample structures with a single easy axis. In these sample structures the magnetization is aligned along the single easy axis.

The method described herein is particularly suited for magnetic characterisation of sample structure with a maximal transversal dimension perpendicular to the main axis of less than 50 nm, or of less than 30 nm, preferably of less than 10 nm.

Such sample structure may for example be nanowires or nanotubes. Nanowires or nanotubes may be patterned on a carrier substrate.

The method described herein may be configured to measure a sample structure which is a ferromagnet, or an anti-ferromagnet, or a semi-conductor, or a paramagnetic sample structure.

The method described herein is not particularly limited to the material or the chemical composition of the sample structure. The sample structure may for example consist of an amorphous material. The sample structure may be made from metal. The sample structure may be an alloy. The sample structure may also be a biological sample structure, for example a paramagnetic sample structure.

The method may furthermore be configured to detect magnetic inhomogeneities in linearly aligned magnetic sample structures, which may for example be subunits of a magnetic main structure.

The method disclosed in this invention is not particularly limited to the nature of the longitudinal anisotropic magnetic sample structure having a nanometre cross-sectional dimension.

The method presented herein is suitable for detecting the presence of nano-defects in magnetic longitudinal nanostructures. It is furthermore suitable for quantitative and/or qualitative characterisation of these nano-defects.

The method may for example be used to detect internal gaps in a NW, fluctuation in saturation magnetization and/or grain boundaries perpendicular to the NW axis direction. The method may also be used to detect other physical or chemical imperfections which might cause the local fluctuations of magnetizations along the NWs.

Moreover, the present method is also suitable for detecting microscopic magnetic effects induced by the various types of DWs, including vortex and transverse walls, with various rotation of magnetization parallel to the NW directions. The present invention provides a method for direct probing of such microscopic (weak) magnetic defects, paving the way to control and tailor spin transport in many of the emerging spintronic devices with unprecedent precision and quantitative accuracy.

SHORT DESCRIPTION OF THE DRAWINGS

Exemplar embodiments of the invention are disclosed in the description and illustrated by the drawings in which:

FIG. 1A shows the scanning system is operated at constant frequency shift mode, and FIG. 1B shows the scanning system operated at constant height mode.

FIG. 2A is a side view and FIG. 2B is a top view.

FIG. 3C is a surface plot, and FIG. 3E is a contour plot of the same SNVM/AFM image.

EXAMPLES OF EMBODIMENTS OF THE PRESENT INVENTION

In an embodiment of this invention, the sample under study was an array of CoFeB NWs with cross-section area of ca. 120 nm$^2$ and 6 nm wire width and a wire length in the millimetre range, as described in S. Dutta et al., "Sub-100 nm2 Cobalt Interconnects," in *IEEE Electron Device Letters*, vol. 39, no. 5, pp. 731-734, May 2018, doi: 10.1109/LED.2018.2821923. The NWs were fabricated through subtractive patterning by borrowing the concept of gate spacers from complementary metal-oxide-semiconductor (CMOS) manufacturing processes. CoFeB is selectively etched on the sidewall of sacrificial SiO$_2$ lines, thus creating a pathway to achieve ultimate NWs dimension over large area using standard lithographic techniques.

The amorphous nature of the patterned CoFeB NWs was confirmed by scanning electron microscopy (SEM) and transmission microscopy (TEM) imaging (not shown).

While the invention was performed on the magnetic NWs described in the previous paragraphs, it will be obvious to the skilled person that the invention is not limited to these specific NWs and that other longitudinal anisotropic magnetic sample structures with nanometre cross-sections are also suitable sample structures.

Figure 1A:
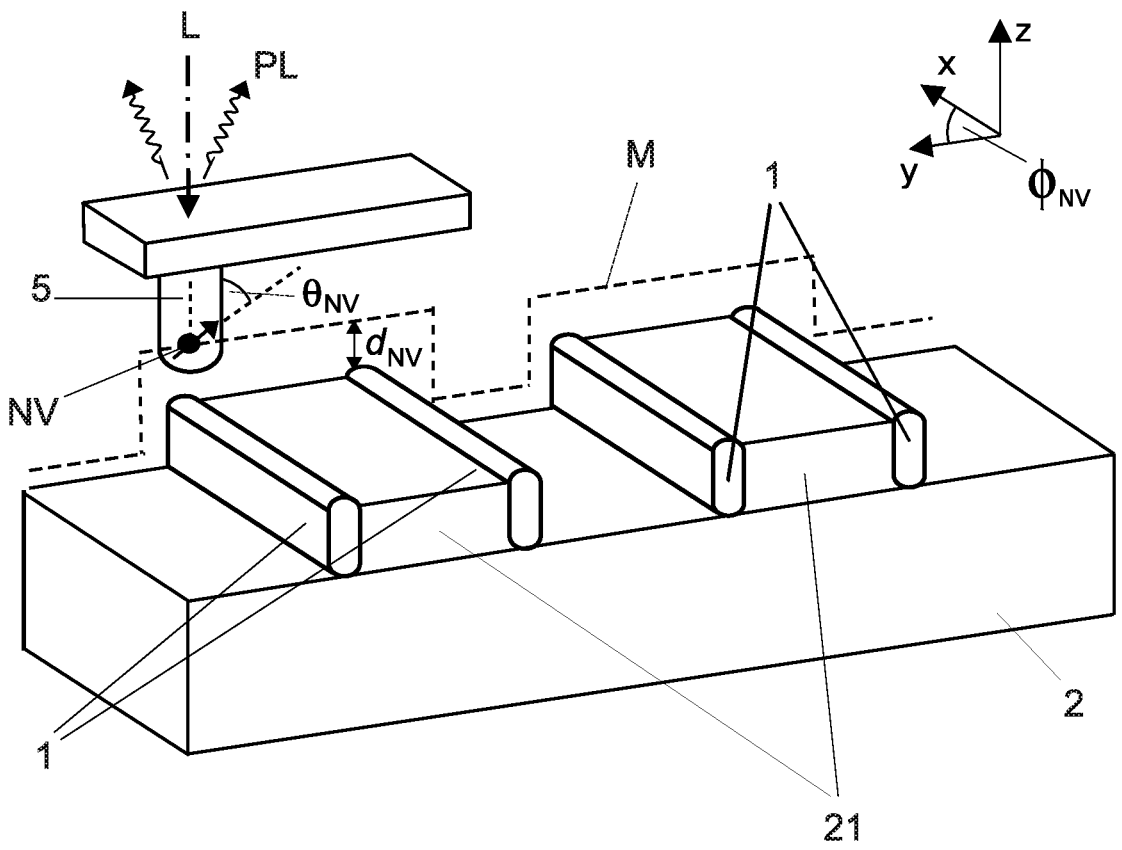
FIGS. 1A and 1B are schematic representations of possible embodiments of Nitrogen-vacancy magnetometry (SNVM) set-ups measuring NW arrays, whereby
Figure 1B:
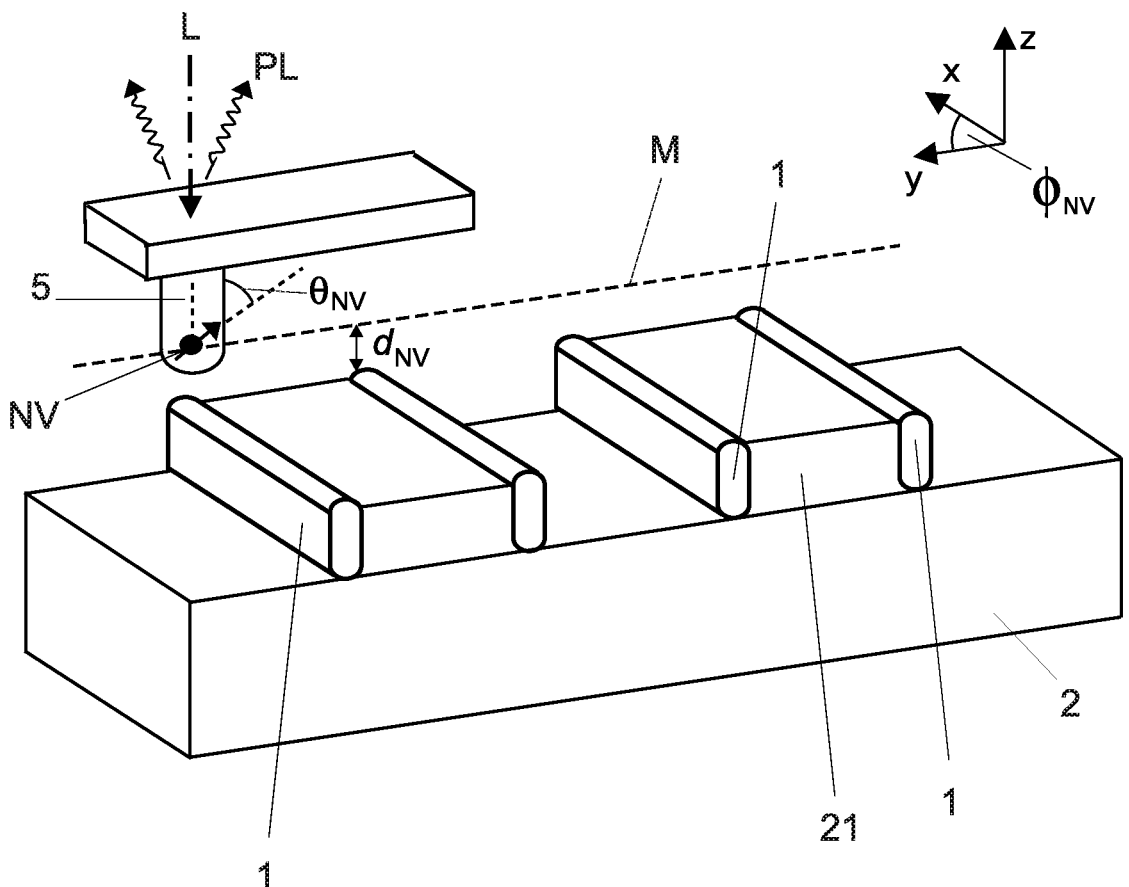

FIG. 1A shows a schematic 3D view of NWs arranged on a possible carrier structure 2. The carrier structure 2 may for example be made of silicon on which a layer of SiO$_2$ is deposited. The carrier structure may comprise a plurality of sacrificial lines 21 which are preferably parallel to each other, two of such lines 21 are depicted in FIGS. 1A and 1B. The NWs 1 are etched on the side walls of these sacrificial lines 21.

Other arrangements of NWs are possible and the invention is not limited to any particular kind of arrangement of NWs on a carrier substrate. NWs may also be embedded into a carrier substrate, or embedded inside a matrix layer, which may be disposed on a carrier substrate.

The dimensions of the patterned NWs were determined by cross-section scanning transmission electron microscopy (STEM). The width of the NWs was 6 nm±0.5 nm, the cross-sectional area of the NW was 120±5 nm². The sacrificial SiO2 lines 21 were less than 500 4 nm in width. The sacrificial lines with the lateral NWs were arranged in parallel such that the carrier substrate contained between 3000 and 5000 NWs per millimetre (mm) cross-sectional width. It is important that the sacrificial lines 21 are non-magnetic to avoid interference with the magnetic field of the NWs 1 arranged on the lines.

The in-plane magnetization of individual NW on the above-described NW array was assessed. The NW arrays exhibited an in-plane magnetization along each wire as observed by the hysteresis loops measured by vibrating sample magnetometry (data not shown).

The magnetization loops on a millimetre wide carrier structure with approximately 4000 NWs of the similar length arranged in parallel, uniformly distributed over the area were measured and analysed using First Order Reversal Curves (FORC).

The FORC method is a known statistical approach to study the switching processes in an assembly of magnetic entities ranging from nm to bulk sizes.

These analyses revealed a rather narrow distributions of both switching and interaction fields in the NW array and suggested that the NWs are rather magnetic uniform having similar individual switching fields, whereas the detected tight interaction field distribution centred in zero demonstrated nearly no magnetic interactions between the wires.

The measurements failed to detect the presence of any nonuniformities or nano-defects in individual NWs.

Nonuniformities were however detected by the method presented by this invention. Schematics of possible experimental setups of this invention are shown in FIGS. 1A and 1B. The solid lattice probe, in the present case a diamond probe with a diamond tip 5 comprises a single NV⁻ defect NV, which is positioned at a distance $d_{NV}$ from the surface of NW array.

Magnetic imaging was performed with a commercial SNVM (the Qnami ProteusQ, Qnami AG) operating under ambient conditions. A commercial diamond tip hosting a single NV⁻ defect at its apex (Qnami, Quantilever MX) has an integrated quartz tuning fork to allow frequency modulation-based AFM (FM-AFM) and is scanned above the NW array. Other control methods or modes, such as amplitude-modulation AFM (AM-AFM) or contact mode AFM, are also suited and may be used to control the AFM scan. The invention is not particularly limited to any specific AFM control method.

The orientation of the NV⁻ centre was characterized by the polar angle $\theta_{NV}$ and the azimuthal angle $\phi_{NV}$, which were determined to be $\theta_{NV}$=57.1°±2.5° and $\phi_{NV}$=270.3°±0.9° respectively.

In one aspect of the invention, as depicted in FIG. 1A, the scan of the sample or the NW array is performed at a constant frequency shift ode, also called a constant force mode. The movement of the NV⁻ defect contained in the diamond tip 5 of the probe across the NW array during the scan is shown as a dashed line M. In this mode a predefined area is scanned by following the surface topography of the sample or the NW array, whereby the frequency shift of the tuning fork is the same as its predefined level. The predefined level is the feedback signal in the z-feedback of the scanning probe system. In other words, the distance $d_{NV}$ between the NV⁻ defect and the surface of the sample or the NW array is maintained constant.

In an alternative aspect of this invention, the scan of sample or the NW array is performed at constant height mode. In this mode the NV defect follows the dashed line M shown in FIG. 1B during the scan. The movement of the NV⁻ defect across the sample structure or the array is plane parallel to the average slope of the sample surface but not lower than the highest point in the predefined scan area. This mode does not require a z-feedback. It may be performed as an open loop.

Figure 2A:
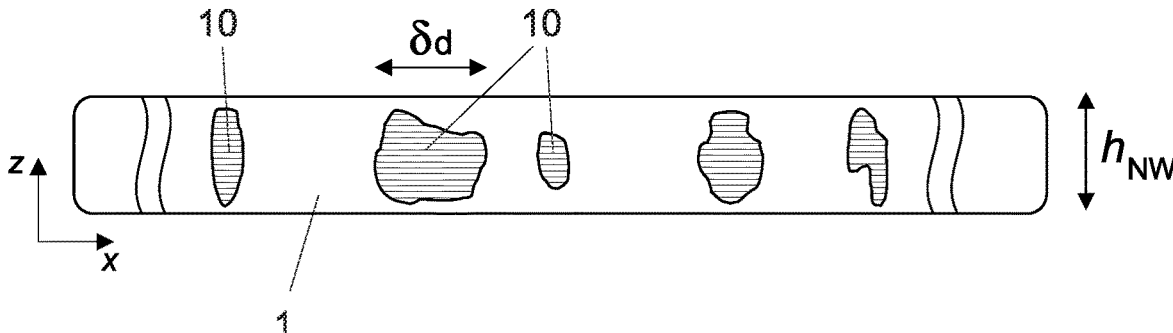
FIGS. 2A and 2B is a schematic representation of two different section views of a NW with detected defects depicted as cross-hatched areas.
Figure 2B:
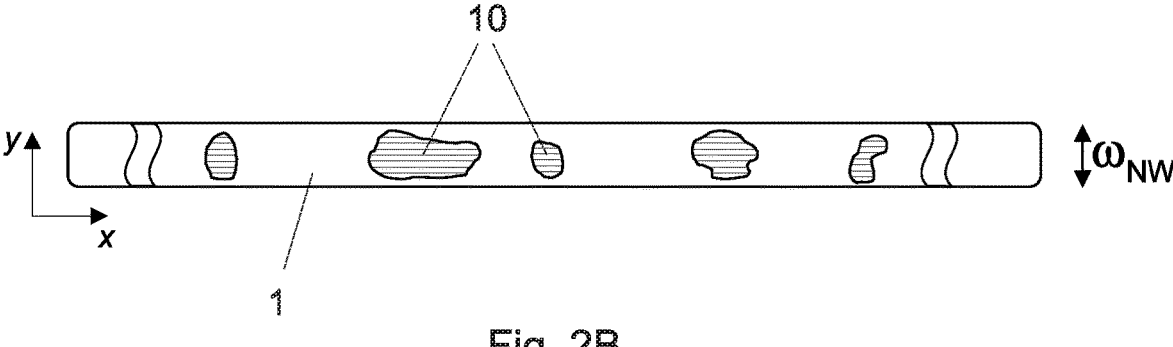

FIGS. 2A and 2B schematically depicts a section of a NW with nano-defects 10 giving rise to inconsistencies in local magnetizations. Two different section views are shown together with the Cartesian coordinator defined in FIGS. 1A and 1B. The defect 10 has a width 8d along the NW direction. The NW height $h_{NW}$ and width $\omega_{NW}$ define the cross-section area of the NWs. The defect area 10 has a higher or lower local magnetization compared to the defect-free area of the NW. The shape of the defects is random and in most cases is irregular. The shape of the defect is not confined to any specific type of geometrical shape. The present method permits to determine the size and approximate shape of the defects, but not the exact contours of the nano-defects in the NWs.

Figure 3A:
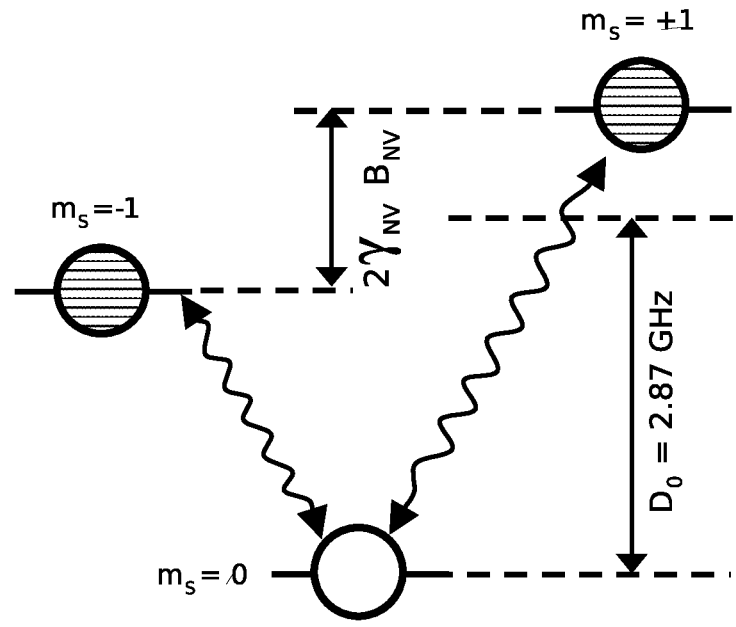
FIG. 3A is a schematical illustration of different energy levels of negatively charged NV$^-$ centre in diamond, whereby transitions from the ground state or fluorescence bright state m$_s$=0 to fluorescence dark stages states m$_s$=+/−1 under continuous microwave excitation are indicated as waved arrows.

The ground state of negatively charged NV⁻ defect in the diamond tip 5 of the probe is a spin triplet state, consisting of the magnetic sublevels $|m_s=0\rangle$ and $|m_s=+1\rangle$ as depicted in FIG. 3A, where $m_s$ refers to the magnetic quantum number along the NV⁻ quantization axis. The transition from fluorescence bright state $m_s=0$ to fluorescence dark states $m_s=+/-1$ under continuous microwave excitation can be probed by optically detected magnetic resonance (ODMR) spectrum shown in FIG. 3B.

In the absence of an external magnetic field, the states $|m_s=+1\rangle$ are degenerate and exhibit a splitting of $D_0$=2.87 GHz from $|m_s=0\rangle$. When an external magnetic field is applied along the NV⁻ axis, it induces a Zeeman splitting proportional to $2\gamma_{NV}B_{NV}$ of the sublevels $|m_s=+1\rangle$, where $\gamma_{NV}$=28 GHz/T is the gyromagnetic ratio, and $B_{NV}$ is the detected magnetic field projected on the NV⁻ quantization axis. In this study, the NV⁻ spin was initialized with 515 nm green laser L, shown in FIGS. 1A and 1B, and its red photoluminescence PL signal was optically read out via the confocal microscope module. This setup enables optical detection of ODMR of NV⁻ defects after initialization into the fluorescent bright $|m_s=0\rangle$ ground state.

Figure 3B:
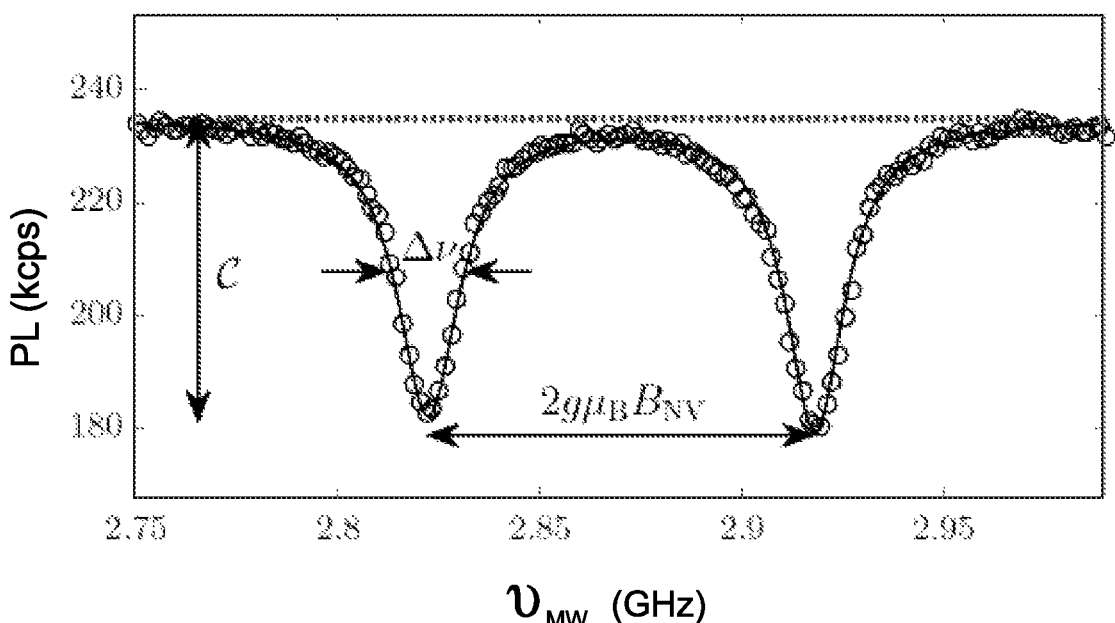
FIG. 3B is an optically detected magnetic resonance spectrum of a single scanning NV$^-$ centre used in this study, with a dc detection sensitivity of 2.3±0.2 ρT/√Hz.

A near-field microwave, placed at a distance of no more than 0.5 mm, preferably no more than 0.1 mm to the NV⁻ centre in the sensor tip of the probe, drives the ground state spin population resonantly with either of the $|m_s=0\rangle$ to $|m_s=+1\rangle$ transitions to populate the less fluorescent $|m_s=+1\rangle$ ground states. As shown in FIG. 3B, which is a diagram of the integrated PL signals over the frequency sweep of the near-field microwave, the shift in population resulted in a significant drop in NV fluorescence, with an ODMR contrast of around 24%.

The microwave frequency $f_{MW}$ difference between the two optically detected ODMR resonance dips, as shown in the diagram of FIG. 3B, thus yields a direct quantitative measure of $B_{NV}$ in a self-calibrated manner, via the simple relation of $\Delta\upsilon=2\gamma_{NV}B_{NV}$, where $\gamma_{NV}$=$g_e$·$\mu_B$/h~28 MHz·mT⁻¹ is the reduced NV gyromagnetic ratio. By fitting the ODMR spectrum, a dc magnetic sensitivity of 2.3±0.2 μT/√Hz has been confirmed.

A bias field $B_b$ of approximately 1 mT was applied along the NV defect axis to determine the sign of the measured magnetic fields. Due to the tip-sample interaction, the tuning fork frequency shift (Δf=5 Hz for all the measurements in this study) was used as the z-feedback during the scanning in order to ensure a constant tip-sample distance $z_{NV}$. The distance between the NV⁻ centre sensor and the sample surface was calibrated to be $z_{NV}$=59.7±1.8 nm through a calibration process above the edges of a uniformly magnetized ferromagnetic strip.

The NV⁻ centre to-sample (or NV⁻ fly height) distance calibration between the NV⁻ spin sensor tip and the sample surface was inferred by mapping the stray magnetic field generated above the upward (downwards) edge of a uniformly magnetized ferromagnetic thin film strip, made of for example CoFeB. In this calibration step the NV⁻ defect carried by the diamond tip integrated in a quartz tuning-fork sensor, operating in shear force mode, flew at a distance d above the ultrathin perpendicularly magnetized calibration sample with a defined thickness. The calibrations were performed in both up-step and down-step sides of a very wide CoFeB strip (20 μm wide along x direction, and 200 μm long along y direction). The measured $B_{NV}$ profile was recorded while scanning the NV⁻ defect across the two edges of 20 μm wide [Ta/CoFeB (~1 nm)/MgO/Ta] calibration strip. The distance d was then extracted by fitting the experimental data, using a known method described in T. Hingant, et al. Phys. Rev. Applied 4, 014003 (2015), https://doi.org/10.1103/PhysRevApplied.4.014003.

A preliminary quick characterization of a magnetic field distribution is also possible by imaging iso-magnetic field contours that are resonant to a specific microwave frequency $f_{MW}$, hereinafter referred to as 'iso-B' mode, which may have a pixel dwell time of no more than 20 ms. SVNM images in iso-B mode of sample NWs are shown in FIG. 3C.

In this imaging mode, the NV⁻ defect PL intensity was monitored while scanning the magnetic sample and applying a microwave field with a fixed frequency $f_{iso}$. The PL image exhibits dark contours when the electron spin transition is in resonance with the chosen microwave frequency.

Figure 3E:
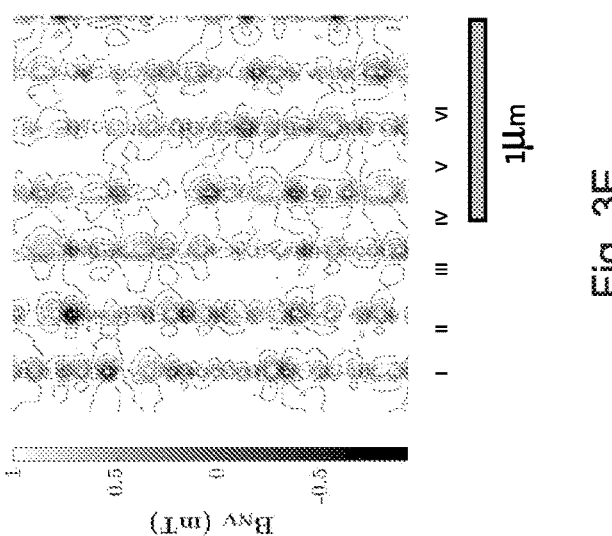
FIGS. 3D and 3E show different plots SNVM/AFM images of the same section of carrier substrate as imaged in FIG. 3C in full B mode with a field range from −1 mT to 1 mT, whereby
Figure 3D:
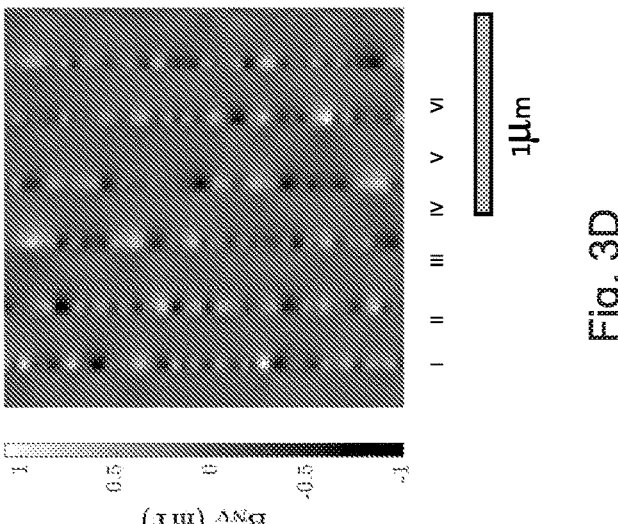
Figure 3C:
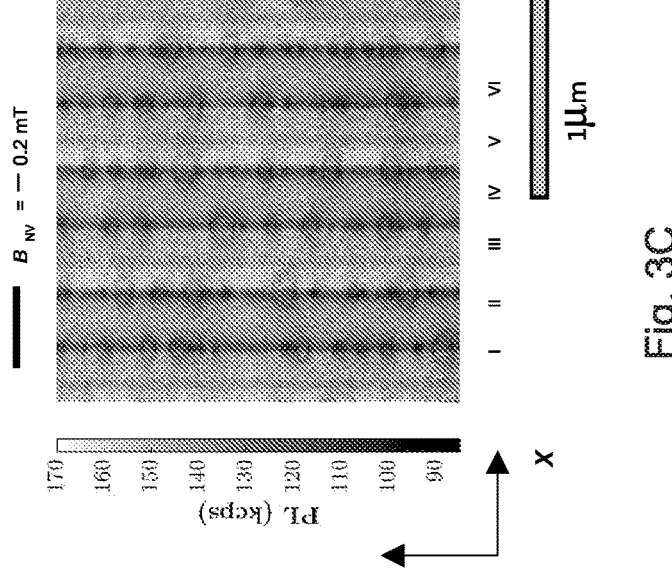
FIG. 3C shows an SNVM/atomic force microscope (AFM) image of a carrier substrate with six parallel CoFeB NWs in iso-B mode corresponding to the magnetic component of B$_{NV}$=0.2 mT.

In FIGS. 3C, 3D, and 3E the roman numbers I to VI shown underneath the images indicate the positions of six NWs on the array.

The iso-B mode image shown in FIG. 3C corresponds to the magnetic component of $B_{NV}$=0.2 mT. The grey scale indicates the PL output signal in kilo counts per second (kcps) The dark, primarily rounded contours along and around the length of the six NWs correspond to the same magnetic field of 0.2 mT measured along the NV⁻ axis.

In the iso-B PL image shown in FIG. 3C, dark lines can be seen along the CoFeB NWs. These lines are a result of the plasmonic quenching effect. The plasmonic quenching effect is known in the art. On top of the dark line in FIG. 3C, round-shaped "ring" features can be discerned along the NWs. These ring features may be positioned at either side of the NW or may be centred at or close to the main axis of the NW at two different orientations of the sample, respectively. The ring feature is related to the NV⁻ orientation with respect to the NW spatial orientations.

To determine the full magnetic field $B_{NV}$ distribution, an ODMR spectrum can for example be recorded at each position or pixel during the scan to deliver a complete scan of the magnetic field, hereinafter called 'full-B' mode. In this study, a pixel integration time of 4.5 seconds was used in all the full-B mode images to ensure a reasonable signal to noise ratio, as shown in FIGS. 3D and 3E depicting full B-mode SNVM/AFM images of sample NWs. However, this imaging time is relatively long and may not be suitable or desirable for all applications.

FIGS. 3D and 3E show a full-B scan of the same area scanned in iso-B mode of FIG. 3C. The images correspond to an area size of 2 μm×2 μm. The magnetic field range scanned was −1 mT to 1 mT. In this plot, the density and shape of local stray magnetic fields in the scanned range are indicated in different intensities of grey shades.

Figure D is a surface plot of the imaged area with the greyscale indicating the magnetization of a scanned pixel.

FIG. 3E corresponds to the same image shown is a contour plot.

The SNVM measurements performed in this study were repeated using several different single-NV⁻ tips with different NV⁻ orientations. In addition, sample orientation with respect to the NV⁻ tip was also varied between different experiments. The results of these different set ups are consistent throughout.

The unexpected observations in SNVM/AFM results detecting magnetic stray fields caused by nano-defects in the structure of the NWs were subsequently confirmed by numerical analysis of SNVM image simulations as part of which the geometry of the CoFeB NWs was modelled according to morphology data based on TEM images (not shown).

The TEM measurements performed as part of the study indicated that defects might be present in the wires. However, the expected defects were in the range of 10 nm to 100 nm in width along the NW.

Based on the state of the art, defects in this range were up to today not expected affect the magnetic field of a NW. These simulations confirm that the detected magnetic inhomogeneities measured in SNVM/AFM are linked to nano-defects, such as geometric inconsistencies and chemical inhomogeneities in the NWs.

This invention arrived at the new insight that state-of-the-art nanowires may indeed contain a plurality of nano-defects and that these nano-defects cause weak magnetic stray fields, which can be measured by SNVM. Local changes in magnetic field can for example be due to an inconsistent NW geometry, such as roughness, interruptions, edges, and shape deformations, and defectivity, such as local crystallinity changes, point defects and amorphous regions.

Clearly, as a general principle, the combination of increased NWs density on an NW array and low intensity of local stray magnetic field caused by such nano-defects in individual NWs add to the complexity of mapping defects within an NW array.

Behind this background it is remarkable that by using the present method it was possible to detect a relative high density of weak magnetic inhomogeneities in the measured NWs. The magnetic inhomogeneities of the wires could be detected in full-B modes, as well as in iso-B modes. The results of these studies provided quantitative information on the associated magnetic field distribution.

Moreover, qualitative information concerning the nature of the defects causing the magnetic inhomogeneities, could also be determined on the basis of numerical analysis and modelling. It could be shown that simulation data can be used to interpret the SNVM measurements to arrive at a quantitative and/or a qualitative characterisation of the defects or inconsistencies.

The combination between the experimental SNVM data and simulation SNVM images adds to the unprecedented capability of the present invention to determine weak variations of magnetic properties in ultra-scaled magnetic devices.

Up to now subtle magnetic defects in magnetic longitudinal nanostructures have so far gone largely undetected. The present invention shows a clear pathway for the quantitative analysis of novel magnetic materials for spintronic devices at aggressively scaled dimensions.

It should be understood, that various changes and modifications to the presently embodiment described herein will be apparent to those skilled in the art. Such changes and modifications may be made without departing from the present invention. To the extent that these embodiments and modifications do not depart from the scope of the claims, it is intended that they are also included in the invention disclosed herein.

The invention claimed is:

1. Method for nonperturbative detection of one or more magnetic inhomogeneities resulting from nano-defects in a longitudinal magnetic sample structure possessing a shape-induced anisotropy and having a widest nanometric cross-sectional dimension from 1 nm to 500 nm, or from 1 nm to 50 nm comprising:
   a) movably positioning a sensing surface of a solid-state lattice sensor of diamond material, comprising one single spin defect (NV) in the apex of the solid-state lattice sensor, at a first scanning position in proximity of the magnetic sample structure,
   b) irradiating the one spin defect (NV) by applying optical radiation (L) and a microwave field continuously or in one or more pulses to the one spin defect (NV) such as to detect a Zeeman shift upon exposure of the irradiated one spin defect to the magnetic field of the magnetic sample structure,
   c) detecting a photoluminescence (PL) output signal from the solid-state lattice sensor comprising the one spin defect (NV),
   d) scanning the surface of the magnetic sample structure in performing steps a) to c) at a series of scanning positions over at least a portion of the length of the magnetic sample structure such as to obtain quantitative information on the magnetic field spatial distribution,
   wherein an optically detected magnetic resonance (ODMR) spectrum is recorded at each of said scanning positions.

2. The method according to claim 1, wherein the spin defect (NV) is a nitrogen-vacancy (NV) point defect in the diamond lattice.

3. The method according to claim 2, comprising the step of mapping detected inhomogeneities in a magnetization distribution along a scanned portion of the magnetic sample structure.

4. The method according to claim 2, wherein the spin defect is located 100 nm or less, 50 nm or less, 20 nm or less, or 10 nm or less, from the sensing surface of the solid-state lattice sensor.

5. The method according to claim 1, wherein the diamond sensor is a monocrystalline diamond sensor.

6. The method according to claim 1, comprising the step of mapping detected inhomogeneities in a magnetization distribution along a scanned portion of the magnetic sample structure.

7. The method according to claim 1, wherein the magnetic field strength at a scanning position is related to an intensity of PL output signal at that scanning position.

8. The method according to claim 1, wherein the magnetic field strength is determined on the basis of the separation of resonance peaks in the recorded ODMR spectrum.

9. The method according to claim 1, wherein a detected inhomogeneity in a magnetic field distribution is used to identify and/or to quantify a local inconsistency or defect, such as an inconsistency in geometry, in stoichiometry or in chemical composition, and/or defects in crystallinity or in amorphous characteristics, optionally on the basis of a set of predetermined data.

10. The method according to claim 9, wherein the detected inhomogeneity in the magnetic field distribution is based on a set of predetermined data, and wherein said predetermined data are empirical data, for example data obtained from previous measurements of comparable or substantially the same magnetic sample structures.

11. The method according to claim 1, wherein the sensing surface of the solid-state lattice sensor is positioned no more than 100 nm, or no more than 50 nm, or no more than 20 nm, or no more than 10 nm, or no more than 1 nm, from the sample surface.

12. The method according to claim 1, wherein the spin defect is located 100 nm or less, 50 nm or less, 20 nm or less, or 10 nm or less, from the sensing surface of the solid-state lattice sensor.

13. The method according to claim 1, wherein the solid-state lattice sensor has a detection sensitivity of no more than 10 $\mu T/\sqrt{Hz}$, or no more than 5 $\mu T/\sqrt{Hz}$, or no more than 2.5 $\mu T/\sqrt{Hz}$.

14. The method according to claim 1, wherein the magnetic sample structure is a uniaxial sample structure with a single easy axis and the magnetization is aligned along the single easy axis of the magnetic sample structure.

15. The method according to claim 1, wherein the magnetic sample structure has at least one maximal transversal dimension perpendicular to its main axis of less than 50 nm, or of less than 30 nm, or of less than 10 nm.

16. The method according to claim 1, the magnetic sample structure being a ferromagnet, an anti-ferromagnet, a semi-conductor or a paramagnetic sample structure.

17. The method according to claim 1, wherein the magnetic sample structure is a nanowire or nanotube.

18. The method according to claim 1, configured to scan a plurality of nanowires arranged on or embedded in a carrier substrate.

19. The method according to claim 1, wherein the magnetic sample structure is a nanowire, a nanotube, or a plurality of nanowires embedded in a carrier substrate.

* * * * *